United States Patent
Dasar et al.

(10) Patent No.: US 9,612,759 B2
(45) Date of Patent: Apr. 4, 2017

(54) SYSTEMS AND METHODS FOR RAID STORAGE CONFIGURATION USING HETEREOGENOUS PHYSICAL DISK (PD) SET UP

(71) Applicants: Sundar Dasar, Round Rock, TX (US); Sanjeev S. Dambal, Austin, TX (US); Satyajit D. Desai, Round Rock, TX (US); Vance E. Corn, Austin, TX (US); Patrick O. Boyd, Austin, TX (US)

(72) Inventors: Sundar Dasar, Round Rock, TX (US); Sanjeev S. Dambal, Austin, TX (US); Satyajit D. Desai, Round Rock, TX (US); Vance E. Corn, Austin, TX (US); Patrick O. Boyd, Austin, TX (US)

(73) Assignee: Dell Products LP, Round Rock, TX (US)

( * ) Notice: Subject to any disclaimer, the term of this patent is extended or adjusted under 35 U.S.C. 154(b) by 129 days.

(21) Appl. No.: 14/713,443

(22) Filed: May 15, 2015

(65) Prior Publication Data

US 2016/0335008 A1    Nov. 17, 2016

(51) Int. Cl.
*G06F 12/00*    (2006.01)
*G06F 3/06*    (2006.01)

(52) U.S. Cl.
CPC .......... *G06F 3/0619* (2013.01); *G06F 3/0635* (2013.01); *G06F 3/0665* (2013.01); *G06F 3/0689* (2013.01); *G06F 3/0605* (2013.01); *G06F 3/0607* (2013.01); *G06F 3/0631* (2013.01); *G06F 3/0664* (2013.01)

(58) Field of Classification Search
USPC ....................................................... 711/114
See application file for complete search history.

(56) References Cited

U.S. PATENT DOCUMENTS

| | | | |
|---|---|---|---|
| 8,370,659 B2 | 2/2013 | Chiasson et al. | |
| 8,832,369 B2 | 9/2014 | Zhang et al. | |
| 2008/0140930 A1* | 6/2008 | Hotchkiss | G06F 3/0605 711/114 |
| 2012/0110262 A1 | 5/2012 | Zhang et al. | |
| 2014/0372793 A1 | 12/2014 | Nelogal et al. | |
| 2015/0039871 A1 | 2/2015 | Shetty et al. | |

OTHER PUBLICATIONS

Liendo et al., "Systems and Methods for Executable File Identity Capture During Indirect Application Launch", U.S. Appl. No. 14/182,647, filed Feb. 18, 2013, 27 pgs.
Kelly, "VCE IT Lecture Notes", Feb. 12, 2013, 5 pgs.

* cited by examiner

*Primary Examiner* — Mardochee Chery
(74) *Attorney, Agent, or Firm* — Egan Peterman Enders Huston

(57) ABSTRACT

Systems and methods are provided that may be used to automatically create RAID configuration with heterogeneous Physical Disk (PD) set up using Virtual Disk (VD) RAID Level and size, for example, to allow replication of a given RAID configuration across multiple different RAID platform systems regardless of the underlying storage disk sizes and/or storage disk types.

22 Claims, 4 Drawing Sheets

SYSTEMS AND METHODS FOR RAID STORAGE CONFIGURATION USING HETEREOGENOUS PHYSICAL DISK (PD) SET UP

FIELD OF THE INVENTION

This invention relates generally to information handling systems and, more particularly, to RAID storage configuration.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems and methods for controlling data transfer to and from a redundant array of independent disks (RAID) memory storage system are known in the art. A RAID system is a data storage system in which data is distributed across a group of physical disks (PDs) in the form of hard disk drive or solid state drive storage devices functioning as a storage unit. A RAID system employs a RAID controller that manages the storage of data on the multiple PDs of the RAID storage system. Often, information stored on each PD is duplicated on other disks in the array, creating redundancy to ensure no information is lost if disk failure occurs. Also, commonly, parity is calculated across a set of information stored on PDs of the array. RAID systems achieve redundancy in two methods—mirroring and parity. Both mechanisms allow for regeneration of data in the event of disk failure or unreadable disks. The I/O operations on a PD is accessed at the granularity of the size of a logical block and the logical blocks are addressed by logical block address.

Existing conventional RAID system configuration interfaces require a RAID system user to specify the identity and number of PDs to create a required RAID configuration. Replicating a given RAID configuration between RAID systems having very similar or identical PD disk sets is relatively easy. However, it is a complex task to replicate a given RAID configuration between RAID systems having varying size, types, and/or number of PDs.

For example, consider the creation of different RAID level virtual disks (VDs) with different size requirements on a RAID system having two 50 GB PDs and one 100 GB PD. For example, given a requirement to create a RAID 0 VD of size 100 GB (RAID 0 requires minimum of one PD), and a simultaneous requirement to create a RAID 1 VD of size 50 GB (RAID 1 requires minimum of two PDs). In such a case, if the user creates the RAID 0 VD using two 50 GB PDs to achieve 100 GB, then the user cannot create the RAID 1 VD, since there are not enough PDs remaining. As another example, consider the creation of different RAID level VDs with a hot spare on a RAID system having two 50 GB PDs, one 100 GB and one 25 GB PD. For example, given a requirement to create a RAID 0 VD of size 100 GB (RAID 0 requires minimum of one PD), and a simultaneous requirement to create a RAID 1 VD of size 25 GB with a hot spare assigned (RAID 1 requires minimum of two PDs and one PD for hot spare). In such a case if the user selects two 50 GB PDs to create the RAID 0 VD, then the user cannot create the RAID 1 VD since there is not enough PDs remaining. These problems get more complex as the number of disks and combination of RAID levels increase. Also, it is further complicated where a user is allowed to replicate a configuration while keeping the existing configuration.

SUMMARY OF THE INVENTION

Disclosed herein are systems and methods that may be implemented to automatically create RAID configuration with heterogeneous Physical Disk (PD) set up using Virtual Disk (VD) RAID Level and size. In one embodiment, the disclosed systems and methods may be implemented to allow replication of a given RAID configuration across multiple different information handling system (e.g., RAID server system) platforms regardless of the underlying storage disk sizes and/or storage disk types, e.g., simplifying and improving user experience with internal storage configuration and deployment using a solution that is easy and efficient. The disclosed systems and methods may be further implemented in one exemplary embodiment to so replicate RAID configuration across different information handling system platforms with a bias towards maximizing usable space, eliminating empty space on existing disk sets, and maximizing the number of spindles and therefore the speed of the disk set, in a given VD. In one exemplary embodiment, the disclosed systems and methods may be implemented using a heterogeneous PD configuration logic that is configured to recreate a given RAID configuration on information handling systems with heterogeneous disk setup while maintaining existing RAID configuration on a target system. In a further exemplary embodiment, the disclosed systems ad methods may be implemented to automatically create a given RAID configuration without the need of specifying PDs.

In one embodiment, the disclosed systems and methods may be implemented to simplify and improve user experience with internal storage configuration and deployment relative to conventional RAID technology by providing a relatively easy and efficient RAID configuration solution as compared to conventional RAID systems. The disclosed systems and methods may also be implemented in one embodiment to provide a relatively simple and scalable infrastructure for multiple server management consoles that provides greater efficiency for RAID system configuration, e.g., server consoles do not need to implement complicated algorithms to achieve user desired RAID configuration in the manner required by conventional RAID technology and may be implemented without requiring a user to specify identity of PDs to create a given VD.

In one respect, disclosed herein is an information handling system, including: at least one processing device configured to control the transfer of data to and from a redundant array of independent disks (RAID) storage memory that includes an array of multiple individual physical drives (PDs) to which data is written. The information handling system may also include at least one processing device configured to create a requested RAID configuration of multiple virtual disks (VDs) on the RAID storage system by individually performing the following steps for each given VD of the requested RAID configuration until the steps have been individually performed for all VDs of the requested RAID configuration: identifying at least one first group of multiple free PDs of the RAID storage memory that are not assigned to an existing VD, sorting individual PD's from the identified first group of free PDs by ascending storage size, determining if the number of free PDs in the identified first group of free PDs equals or exceeds the minimum number of PDs required for a RAID level of the current given VD, determining if the storage size available on the free PDs in the first identified group of free PDs meets or exceeds a storage size requirement specified for the current given VD, and assigning the minimum number of free PDs required for the RAID level of the current given VD from a subgroup of the smallest free PDs selected from the at least one first group of multiple free PDs of the RAID storage memory if the number of PDs in the identified first group of free PDs equals or exceeds the minimum number of PDs required for a RAID level of the current given VD and if the storage size available on the PDs in the identified first group of free PDs meets or exceeds a storage size requirement specified for the current given VD.

In another respect, disclosed herein is a method of creating a requested redundant array of independent disks (RAID) configuration of multiple virtual disks (VDs) on a RAID storage memory that includes an array of multiple individual physical drives (PDs) to which data is written, including using at least one processing device of an information handling system that is coupled to at least one processing device of the information handling system to create the requested RAID configuration of multiple virtual disks (VDs) on the RAID storage system by individually performing the following steps for each given VD of the requested RAID configuration until the steps have been individually performed for all VDs of the requested RAID configuration: identifying at least one first group of multiple free PDs of the RAID storage memory that are not assigned to an existing VD; sorting individual PD's from the identified first group of free PDs by ascending storage size; determining if the number of free PDs in the identified first group of free PDs equals or exceeds the minimum number of PDs required for a RAID level of the current given VD; determining if the storage size available on the free PDs in the first identified group of free PDs meets or exceeds a storage size requirement specified for the current given VD; and assigning the minimum number of free PDs required for the RAID level of the current given VD from a subgroup of the smallest free PDs selected from the at least one first group of multiple free PDs of the RAID storage memory if the number of PDs in the identified first group of free PDs equals or exceeds the minimum number of PDs required for a RAID level of the current given VD and if the storage size available on the PDs in the identified first group of free PDs meets or exceeds a storage size requirement specified for the current given VD.

DESCRIPTION OF ILLUSTRATIVE EMBODIMENTS

Figure 1:
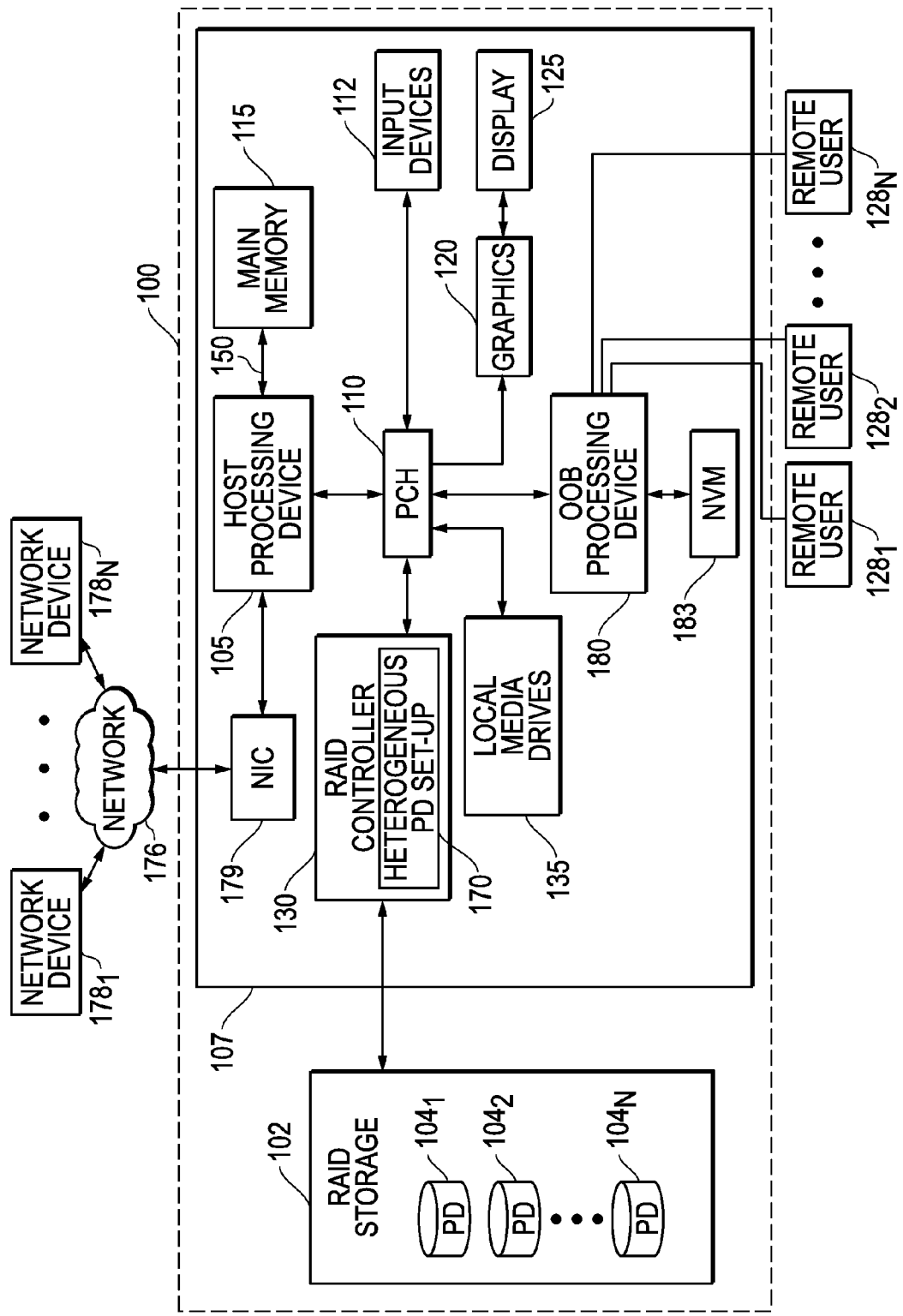
FIG. 1 illustrates a RAID system according to one exemplary embodiment of the disclosed systems and methods.

FIG. 1 illustrates one exemplary embodiment of a RAID system 100 that includes an information handling system 107 configured as a RAID system server coupled to RAID storage memory 102. RAID storage memory 102 includes a RAID array of multiple individual physical drives (PDs) $104_1$ to $104_N$ (e.g., hard disk drives and/or solid state drives) that together function as a single storage unit to which data is written by RAID system server 107, and read from by RAID system server 107. RAID system server 107 writes data to RAID storage memory 102 in a manner such that data is distributed across the multiple PDs of the RAID array according to particular RAID level requirements. Information stored on each PD 104 of RAID storage memory 102 may be duplicated on other PDs 104 in the array, e.g., to create redundancy so that no data is lost if disk failure occurs. As described further herein, the multiple PDs 104 of RAID storage 102 may be heterogeneous in nature, e.g., being of different storage sizes, and/or of different PD hardware and/or file type.

RAID server system 100 of this exemplary embodiment includes at least one host processing device 105 which may be a central processing unit (CPU) such as an Intel Pentium series processor, an Advanced Micro Devices (AMD) processor or other type of host processing device that executes an operating system (OS) for system 100, e.g., Intel x86 processor, AMD x86 processor, ARM core processor, or other type of host processing device. Host processing device 105 may be provided in one embodiment with an integrated memory controller (iMC) to facilitate memory functions, although it will be understood that a memory controller may be alternatively provided as a separate chip or other circuit in other embodiments.

As shown in FIG. 1, main system memory 115 (e.g., DRAM) may be coupled via DDR channel 150 as shown to host processing device 105. As shown, an external display 125 (e.g., LCD or LED display, touchscreen, or other suitable display device) may be coupled to an optional graphics processing unit (GPU) 120 to provide visual images (e.g., via displayed interactive graphical user interface) to the user. GPU 120 is in turn coupled to host processing device 105 via platform controller hub (PCH) 110 which facilitates input/output functions for the information handling system 100. It will be understood that functions of GPU 105 may alternatively or additionally be integrated within the host processing device 105 and/or that other types of graphics processing devices may be present, e.g., graphics-derivative processors such as physics/gaming processors.

Still referring to FIG. 1, local system storage 135 (e.g., one or media drives such as hard disk drive/s, optical drives, NVRAM devices, Flash devices or any other suitable form of internal or external storage) may be coupled to PCH 110 and its controller chip to provide permanent storage for the information handling system 100. External input devices 112 (e.g., such as a keyboard, mouse, touchpad, touchscreen etc.) may be coupled as shown to PCH 110 and its controller chip to enable the user to interact with the information handling system 100 and programs or other software/firmware executing thereon. As further shown, a network interface card (NIC) 179 may be coupled to host processing device 105 to enable communication between RAID system 100 and various multiple network devices $178_1$-$178_n$, which together may form a networking system that allows RAID server system 107 to store data for network devices 178 on PDs 104 of RAID storage memory 102, and to retrieve this stored data for network devices 178.

In the illustrated embodiment, an optional out-of-band processing device 180 (e.g., baseboard management controller (BMC), service processor, embedded processor, embedded controller (EC), remote access controller such as integrated Dell Remote Access Controller (iDRAC) available from Dell Products L.P. of Round Rock, Tex., etc.) may be coupled to PCH 110 and provided with persistent storage/non-volatile memory 183, although an out-of-band processing device with integrated persistent storage may also be employed. As shown in the exemplary embodiment of FIG. 1, out-of-band processing device 180 is a separate and independent processing device from any in-band host central processing unit (CPU) such as host processing device 105 that runs the host OS of a RAID system server 107. In this regard, out-of-band processing device 180 may operate without management of any application executing with a host OS on the host CPU.

As further shown in the embodiment of FIG. 1, RAID server system 107 includes a processing device configured as a RAID controller 130 (e.g., RAID card such as Power-Edge RAID Controller (PERC) card available from Dell, Inc.). RAID controller 130 is present in this embodiment for controlling transfer of data to and from PDs 104 of RAID storage 102, e.g., via storage device disk controller/s. Also shown in FIG. 1 are remote user/s $128_1$ to $128_N$ that in one embodiment may be optionally provided remote access to configure aspects of RAID system 100 from a remote location through out-of-band processing device 180 configured as remote access controller. Further information on RAID controllers and RAID storage operation may be found, for example, in U.S. Pat. No. 8,370,659; U.S. Pat. No. 8,832,369; United States Patent Application Publication 2012/0110262; United States Patent Application Publication No. 2014/0372793; and in United States Patent Application Publication 2015/0039871; each of which is incorporated herein by reference in its entirety for all purposes. In the exemplary embodiment of FIG. 1, RAID controller 130 is configured to execute heterogeneous PD set-up logic 170 to automatically create RAID configuration based on virtual disk (VD) RAID level and size in a manner as described further herein.

It will be understood that the embodiment of FIG. 1 is exemplary only, and that an information handling system may be provided with one or more processing devices that may perform the functions of processing devices 105, 130, and 180 as well as other optional processing devices. Examples of types of processing devices that may be employed include, but are not limited to, central processing units (CPUs), embedded controllers, microcontrollers, application specific integrated circuits (ASICs), field programmable gate arrays (FPGAs), etc. It will also be understood that the particular configuration of RAID system 100 illustrated in FIG. 1 is exemplary only, and that other information handling system and storage system configurations are possible.

Figure 2:
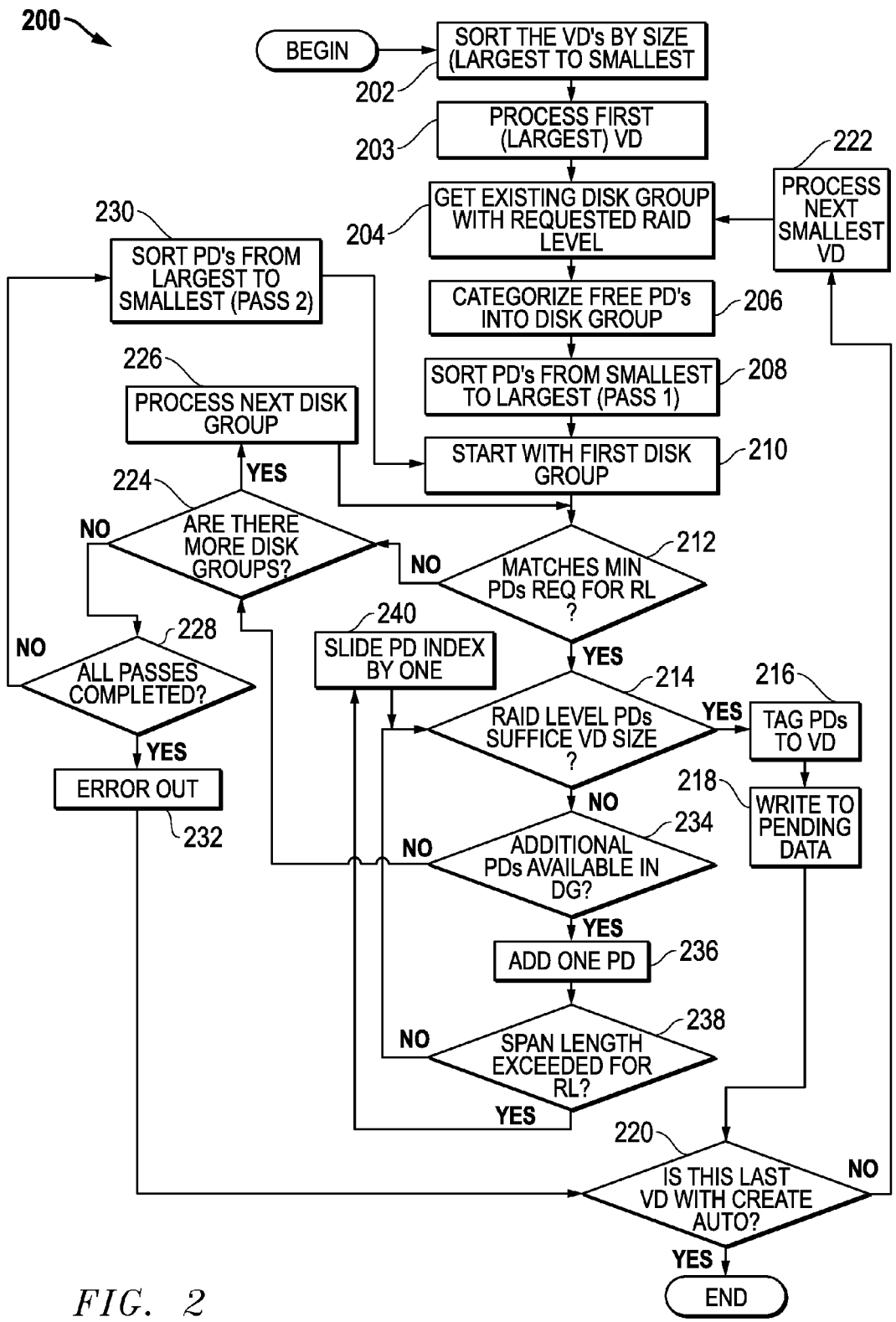
FIG. 2 illustrates automatic RAID configuration methodology according to one exemplary embodiment of the disclosed systems and methods.

FIG. 2 illustrates one exemplary embodiment of methodology 200 that may be implemented (e.g., by heterogeneous PD set-up logic 170 executing on RAID controller 130 of RAID system 100) to automatically create a newly requested (e.g., user-specified) RAID configuration of virtual disks (VDs) (with corresponding assigned PDs 104) on an existing RAID system 100 in response to user-provided RAID configuration input information (e.g., RAID level and storage size for one or more VDs). In one embodiment, methodology 200 may be implemented to allow a user to provide RAID configuration input information that specifies RAID level and storage size for one or more requested VDs, and without requiring the user to identify or specify particular RAID system PDs 104 for assignment to a requested VD. RAID configuration input information may be provided by a local user (e.g., via input devices 112) and/or by a remote user 128. Methodology 200 may be implemented to configure a RAID system 100 that already has an existing RAID configuration of VDs (with some system PDs 104 already assigned to one or more pre-existing VDs), or alternatively may have no existing RAID configuration of VDs (e.g., all system PDs 104 are free). Moreover, methodology 200 may be implemented across differently configured RAID system platforms 100, e.g., having differing numbers and/or storage size PDs 104.

As shown, methodology 200 begins with step 202 where the newly requested RAID configuration (e.g., RAID configuration specified by a user) is analyzed and the new VDs of the newly-requested RAID configuration are identified and sorted by storage size, in this case from largest to smallest storage size VDs. A newly requested RAID configuration may include, for example, requested VD size/s, requested RAID level for each requested VD, number of required PDs for each VD, etc. As an example for purposes of illustration, a requested RAID configuration may include two new VDs: RAID 0 (striping) VD of 100 GB size, and RAID 1 (mirroring) VD of 100 GB size. In this regard, RAID 0 requires one or more system PDs 104 for striping, and RAID 1 requires two system PDs 104 for mirroring. Table 1 below provides examples of different RAID levels that may be automatically configured using the disclosed systems methods, together with other information including corresponding minimum number of PDs 104 to implement a given RAID level for a VD. As shown methodology 200 begins in step 203 with the largest new requested VD identified in step 202.

TABLE 1

| RAID Level | RAID Level Description | Hot Spare Option? | Minimum Number of PDs Required |
|---|---|---|---|
| 0 | Striping | No | 1 |
| 1 | Minoring | Yes | 2 |
| 1E | Minoring with an Odd Number of Drives | Yes | 3 |
| 5 | Striping with Distributed Parity | Yes | 3 |

TABLE 1-continued

| RAID Level | RAID Level Description | Hot Spare Option? | Minimum Number of PDs Required |
|---|---|---|---|
| 5E | Striping with Distributed Hot Spare and Parity | Yes | 4 |
| 00 | Striping across Multiple RAID-0 Arrays | No | 2 |
| 10 | Striping across Multiple RAID-1 Arrays | Yes | 4 |
| 1E0 | Striping across Multiple RAID-1E Arrays | Yes | 6 |
| 50 | Striping across Multiple RAID-5 Arrays | Yes | 6 |

Next, step 204 begins with processing the largest identified new VD of the newly-requested RAID configuration from step 203. Specifically, in step 204 any pre-existing VD group/s (i.e., set/s of PDs used to create a VD) that are already configured on RAID system 100 are identified, and an existing VD group on the RAID system 100 is selected that matches the RAID level of the current newly requested VD being processed (e.g., which initially is the largest newly requested VD group from step 203). Assuming that there is an existing VD group of PDs on RAID system 100 matches the current RAID level, then it is also determined in step 204 if the current newly requested VD can fit on any free space left in the PDs of that identified existing VD group. If this is possible, then the current new VD being processed is created using the determined available free space on the PDs of the selected existing VD group. Step 204 then repeats in the same manner for the next smaller new VD.

However, whenever it is determined in step 204 that it is not possible to fit the current newly requested VD into the free space of the PDs of a pre-existing VD group then methodology 200 proceeds to process the current newly-requested VD by attempting to identify and assign free PDs for use by the current requested VD in a two-pass manner that begins in step 206 with examining any free PDs in the system that currently contain no VDs. As described further below, these free PDs may be first grouped by type based on the ability of the RAID controller 130 to mix types. Then, in the first pass of step 208, free PDs may be sorted by size and analyzed in ascending order, while in the second pass of step 230 free PDs may be sorted by size and analyzed in descending order if necessary. As further described below, second pass of step 230 is executed for the current newly-requested VD only if the required free PDs are not found during the first pass of step 208.

Figure 3:
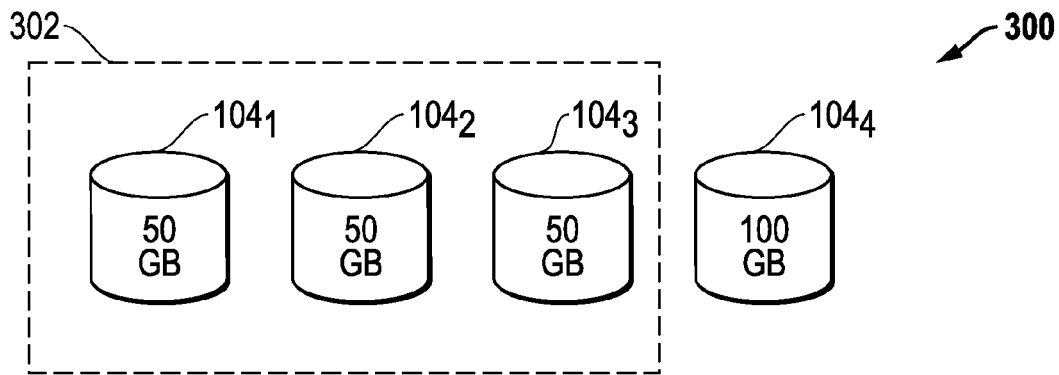
FIG. 3 illustrates a group of free physical disks (PDs) according to one exemplary embodiment of the disclosed systems and methods.

Specifically, in step 206 of methodology 200, free PDs that are not yet assigned to VDs are identified and grouped together into one or more groups of free PDs. In one embodiment, these identified free PDs may be further grouped according to PD hardware and/or file type, e.g., SATA drives grouped together versus IDE drives and vice-versa, FAT file-type drives grouped together versus NTFS file-type drives and vice-versa, etc. Then in step 208, free PDs of each given PD group may be sorted from smallest to largest PD storage size in a first pass of methodology 200. In this exemplary embodiment, the smallest remaining acceptable free PDs may be utilized first if possible for each newly requested VD currently being processed such that larger free PDs are only used when necessary, but otherwise left free for future newly-specified VDs. FIG. 3 illustrates an example of a free PD group 300 that includes four PDs (three free 50 gigabyte PDs and one free 100 gigabyte PD).

In step 210, methodology 200 proceeds with the first group of free PDs from step 206, and in step 212 it is determined whether the first group of free PDs includes the minimum number of PDs required for the RAID level (RL) of the currently processed new VD (e.g., such as including a minimum number of two free PDs for RAID level 1, minimum number of one free PD for RAID level 0, etc.). If not, then methodology 200 proceeds to step 224 where it is determined whether there is another group of free PDs that is available for the first pass analysis. If so, then in step 226 the next available group of free PDs is processed by repeating step 212 as before. FIG. 3 illustrates a subgroup 302 of the three smallest PD's $104_1$ to $104_3$ from free PD group 300 of FIG. 3 that meet the minimum number of PDs required for the RAID level (RL) of the currently processed new VD.

When a group of free PDs is found in step 212 that has the minimum number of PDs required for the RAID level of the currently processed new VD, then methodology 200 proceeds to step 214 where the storage size on the free PDs of the currently-analyzed free PD group is examined to determine if the storage size requirements for the currently processed new VD can be met using a number of free PDs from the subgroup (e.g., subgroup 302) that corresponds to the minimum number of PDs required for the RAID level of the currently processed new VD (e.g., do three free PDs of subgroup 302 from the currently-analyzed group 300 have sufficient storage size for the current requested new VD?). If so, then methodology 200 proceeds to step 216 where this minimum number of PDs of the subgroup from the currently-analyzed PD group are tagged or otherwise assigned to the currently processed VD, followed by writing to pending data in step 218. Then methodology 200 moves to step 220 where it repeats through step 222 to step 204 for the next smallest remaining unprocessed new VD of the newly requested RAID level, or alternately terminates as shown if the last new VD of the newly requested RAID level has already been processed. After given PDs are assigned to a VD in step 216, they become part of pre-existing VD group/s that are analyzed in step 204 for free space in the manner previously described.

Figure 4:
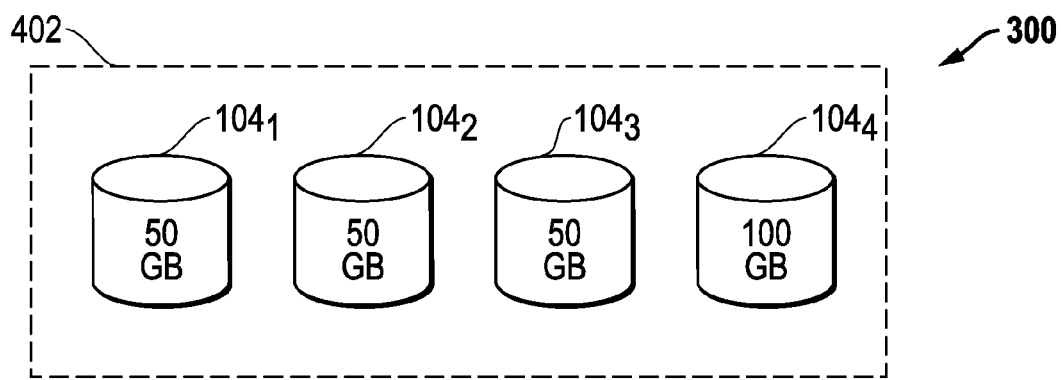
FIG. 4 illustrates a group of free physical disks (PDs) according to one exemplary embodiment of the disclosed systems and methods.

However, if in step 214 it is determined that that the storage size requirements for the currently processed new VD cannot be met using the RAID required minimum number of PDs of the subgroup from the currently-analyzed PD group (e.g., the minimum three free PDs from the subgroup 302 from the currently-analyzed free PD group cannot meet the storage size required for the currently processed new VD), then methodology 200 proceeds to step 234 where it is determined if there are additional free PDs available in the currently-analyzed PD group (DG) to meet the VD storage requirements. If there are, then an additional free PD from the currently-analyzed group is added to the analysis in step 236 (e.g., three free PDs). For example, FIG. 4 illustrates how the 150 gigabyte-sized three-disk free PD subgroup 302 from free PD group 300 may be expanded to be a 250 gigabyte-sized four-disk free PD subgroup 402 by adding an additional PD $104_4$ from free PD group 300 when the currently-processed new VD requires more than 150 gigabyte of free PD storage.

Next it is determined in step 238 if this larger number of free PDs of from the enlarged currently-analyzed PD group exceeds the span length limit (maximum number of PDs allowed in a RAID span by RAID controller 130) for the currently-requested RAID level (RL) in step 238. If RAID controller RAID level span length is found not exceeded in step 238, then methodology returns to step 214 and repeats from this step as before, i.e., the number of analyzed PDs is increased by one and the method is tried again. Thus, each pass starts in step 210 with analyzing the minimum number of free PDs required for a newly requested RAID level and then moving one PD at a time toward the maximum number of PDs allowed for a newly requested RAID level while each time determining if the processed new VD can fit on the number of PDs currently being analyzed. When it is determined that the new VD can fit on the number of PDs currently being analyzed, then the PDs of the currently-analyzed PD group will be selected to create the processed new VD.

Figure 5:
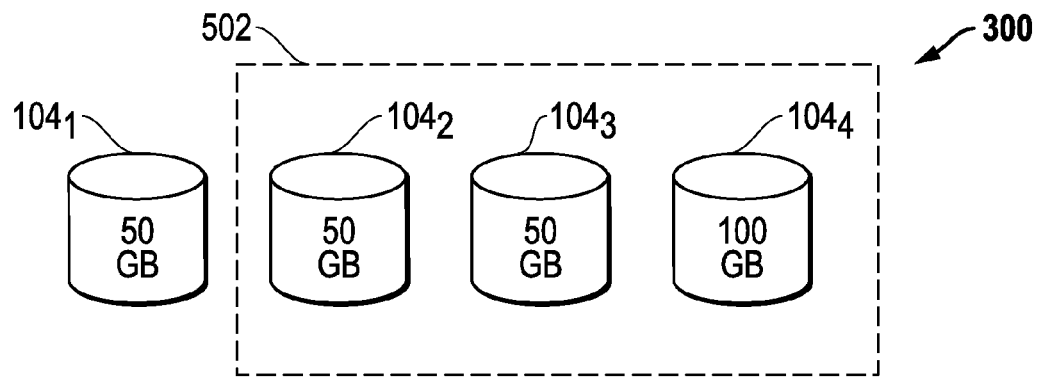
FIG. 5 illustrates a group of free physical disks (PDs) according to one exemplary embodiment of the disclosed systems and methods.

However, if the RAID level span length is found to be exceeded in step 238, then the number of free PDs of the current free PD subgroup (e.g., free PD subgroup 402 of FIG. 4) is reduced by one to maintain the previous number of free PDs, but the free PD index is slid by one drive in step 240 so as to replace one of the previous free PDs from the currently-analyzed free PD group with a new free PD from the currently-analyzed free PD group. This is illustrated in FIG. 5 where the free PD index of subgroup 302 is slid over so as to drop the smallest free PD $104_1$ from group 300 and to add next larger free PD $104_4$ of group 300 to create a new free PD subgroup 402 Then methodology returns to step 214 and repeats from this step as before. This iterative process repeats until it is determined in step 214 that the requested RAID level storage size requirements for the currently processed new VD can be met using a number of free PDs from the currently-analyzed free PD group (in which case methodology proceeds to step 216 as described before), or until it is determined that no additional free PDs remain available in step 234 from the currently-analyzed PD group (in which case methodology proceeds to step 224 as described before). Thus, once the maximum number of PDs allowed in a newly requested RAID level is reached, the first PD in a free PD subgroup of the currently-analyzed PD group is discarded and one additional new PD in the currently-analyzed PD group is added on the end to create a new free PD subgroup, proceeding in this manner until all possible PDs in the currently analyzed PD group have been tried.

Returning to step 224, if there is not another group of free PDs that is available for the first pass analysis for the currently processed new VD, then methodology 200 proceeds to step 228. Step 228 in turn proceeds to step 230 only if the second pass analysis of methodology 200 has not yet been completed. As shown, the second pass analysis begins in step 230 by sorting free PDs of each given PD group from step 206 from largest to smallest PD storage size, and then moves to step 210 where the methodology 200 repeats from step 210 onward, but this time starting with the largest available free PDs first for use by the currently processed new VD. If both first and second passes have been completed in step 228 without tagging free PDs to the currently processed new VD in step 216, then methodology 200 moves from step 228 to step 232 where processing is terminated by an error out for the currently processed new VD (e.g., together with an optional error message to a user indicating that the currently processed new VD cannot be configured). Then methodology 200 proceeds as shown to step 220 where it repeats through step 222 to step 204 for any remaining unprocessed new VDs of the newly requested RAID level, or alternately terminates as shown if the last new VD of the newly requested RAID level has been processed. In this regard, the next smallest remaining unprocessed VD is selected in each iteration of step 222 for current VD processing. This iterative process continues until all VDs of the newly requested RAID level have been processed.

Figure 6:
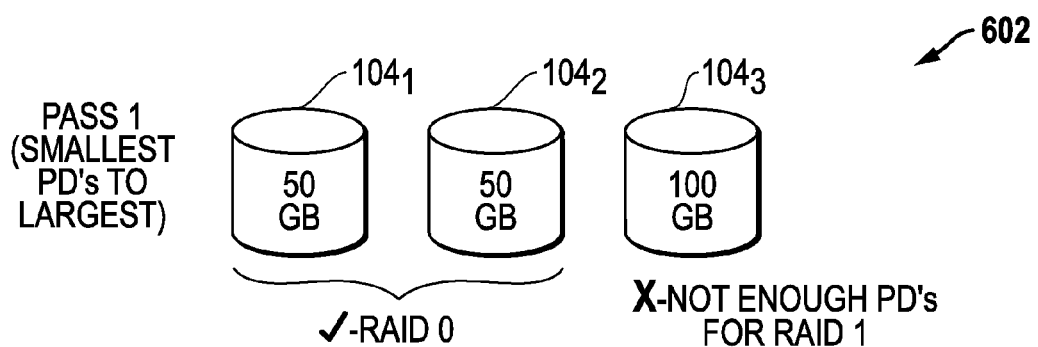
FIG. 6 illustrates first pass results of automatic RAID configuration methodology according to one exemplary embodiment of the disclosed systems and methods.
Figure 7:
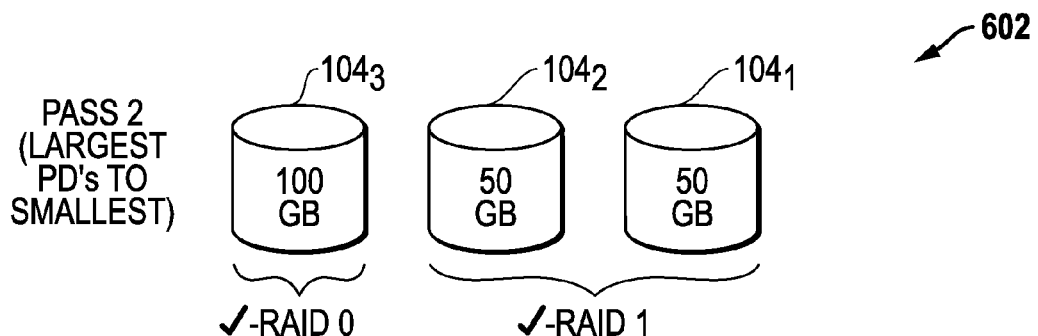
FIG. 7 illustrates second pass results of automatic RAID configuration methodology according to one exemplary embodiment of the disclosed systems and methods.

FIGS. 6 and 7 illustrate an exemplary embodiment of the respective results of first and second passes of methodology 200 that each begin in step 210 of FIG. 2, and using a three-disk free PD group 602 to process a new VD that specifies a 100 gigabyte RAID 0 level (i.e., that requires minimum of one PD) and a 50 gigabyte RAID 1 level (i.e., that requires minimum of two PDs). As shown in FIG. 6, no match is made in the first pass between the requirements of the currently processed new VD and free PDs $104_1$ to $104_3$ of free PD group 602 when the free PDs 104 are ordered from smallest to largest storage size. However, in the second pass the storage size order of the free PD groups $104_1$ to $104_3$ is reversed from largest to smallest, and as shown in FIG. 7 a match is found between the requirements of the currently processed new VD and the available free PDs $104_1$ to $104_3$ of free PD group 602 as shown.

It will be understood that particular number and order of steps of methodology 200 are exemplary only, and that any other combination of additional, fewer and/or alternative steps may employed that are suitable for automatically create a newly requested (e.g., user-specified) RAID configuration of virtual disks (VDs) on an existing RAID system.

It will also be understood that one or more of the tasks, functions, or methodologies described herein (e.g., including methodology 200 of FIG. 2 and tasks or functions of described herein for components 105, 120, 130, 170, 179, 180, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   at least one processing device configured to control the transfer of data to and from a redundant array of independent disks (RAID) storage memory that includes an array of multiple individual physical drives (PDs) to which data is written;
   at least one processing device configured to create a requested RAID configuration of multiple virtual disks (VDs) on the RAID storage system by individually performing the following steps for each given VD of the requested RAID configuration until the steps have been individually performed for all VDs of the requested RAID configuration:
      identifying at least one first group of multiple free PDs of the RAID storage memory that are not assigned to an existing VD,
      sorting individual PD's from the identified first group of free PDs by ascending storage size,
      determining if the number of free PDs in the identified first group of free PDs equals or exceeds the minimum number of PDs required for a RAID level of the current given VD,
      determining if the storage size available on the free PDs in the first identified group of free PDs meets or exceeds a storage size requirement specified for the current given VD, and
      assigning the minimum number of free PDs required for the RAID level of the current given VD from a subgroup of the smallest free PDs selected from the at least one first group of multiple free PDs of the RAID storage memory if the number of PDs in the identified first group of free PDs equals or exceeds the minimum number of PDs required for a RAID level of the current given VD and if the storage size available on the PDs in the identified first group of free PDs meets or exceeds a storage size requirement specified for the current given VD.

2. The information handling system of claim 1, where at least one processing device of the information handling system is configured to assign the minimum number of PDs required for the RAID level of the current given VD from a subgroup of the smallest free PDs selected from the at least one first group of multiple free PDs of the RAID storage memory by first creating a first subgroup of the smallest free PDs from the at least one first group of multiple free PDs of the RAID storage memory, the first subgroup containing a number of free PDs that is equal to the minimum number of PDs required for the RAID level of the current given VD; and either one of:
   then assigning the PDs of the first subgroup of the smallest free PDs to the current given VD if the storage size requirements for the current given VD can be met by the number of free PDs contained in the first subgroup of the smallest free PDs; or
   then creating at least one additional subgroup of the smallest free PDs from the at least one first group of multiple free PDs of the RAID storage memory if the storage size requirements for the current given VD cannot be met by the number of free PDs contained in the first subgroup of the smallest free PDs, the additional subgroup of the smallest free PDs containing a number of free PDs that is greater than the minimum number of PDs required for the RAID level of the current given VD, and then assigning the PDs of the additional subgroup of the smallest free PDs to the current given VD if the storage size requirements for the current given VD can be met by the number of free PDs contained in the additional subgroup of the smallest free PDs.

3. The information handling system of claim 1, where the at least one processing device is further configured to create the requested RAID configuration of multiple virtual disks (VDs) by individually performing the following steps for each given VD of the requested RAID configuration until the steps have been individually performed for all VDs of the requested RAID configuration:
   identifying at least one second group of multiple free PDs of the RAID storage memory that are not assigned to an existing VD;
   sorting individual PD's from the identified second group of free PDs by ascending storage size;
   determining if the number of PDs in the identified second group of free PDs equals or exceeds the minimum number of PDs required for a RAID level of the current given VD;
   determining if the storage size available on the PDs in the second identified group of free PDs meets or exceeds a storage size requirement specified for the current given VD; and
   performing the following step if the number of PDs in the identified first group of free PDs does not equal or exceed the minimum number of PDs required for a RAID level of the current given VD and/or if the storage size available on the PDs in the identified first group of free PDs does not meet or exceed the storage size requirement specified for the current given VD:
      assigning the minimum number of PDs required for the RAID level of the current given VD from a subgroup of the smallest free PDs selected from the at least one second group of multiple free PDs of the RAID storage memory if the number of PDs in the identified second group of free PDs equals or exceeds the minimum number of PDs required for a RAID level of the current given VD and if the storage size available on the PDs in the identified second group of free PDs meets or exceeds a storage size requirement specified for the current given VD.

4. The information handling system of claim 1, where the at least one processing device is configured to identify the at least one group of multiple free PDs of the RAID storage memory that are not assigned to an existing VD by identifying and grouping together free PDs having a common PD hardware type and file type.

5. The information handling system of claim 1, where the at least one processing device is configured to perform the following steps for each given VD of the requested RAID configuration:
   first identify a pre-existing group of PDs of the RAID storage memory that are assigned to an existing VD that is already configured on the information handling system that matches the RAID level of the current given VD and that has sufficient free storage space left to create the current given VD on the pre-existing group of PDs; and
   then create the current given VD on any such identified pre-existing group of PDs rather than assigning any free PDs to the current given VD.

6. The information handling system of claim 1, where the at least one processing device configured to create the requested RAID configuration of multiple virtual disks (VDs) by first sorting the multiple VDs by descending storage size; and then individually performing the following steps for each given VD of the requested RAID configuration by starting with the largest given VD and repeating the following steps again for each successively smaller given VD until the steps have been individually performed for all VDs of the requested RAID configuration:
   identifying at least one first group of multiple free PDs of the RAID storage memory that are not assigned to an existing VD,
   sorting individual PD's from the identified first group of free PDs by ascending storage size,
   determining if the number of PDs in the identified first group of free PDs equals or exceeds the minimum number of PDs required for a RAID level of the current given VD,
   determining if the storage size available on the PDs in the first identified group of free PDs meets or exceeds a storage size requirement specified for the current given VD, and
   assigning the minimum number of PDs required for the RAID level of the current given VD from a subgroup of the smallest free PDs selected from the at least one first group of multiple free PDs of the RAID storage memory if the number of PDs in the identified first group of free PDs equals or exceeds the minimum number of PDs required for a RAID level of the current given VD and if the storage size available on the PDs in the identified first group of free PDs meets or exceeds a storage size requirement specified for the current given VD.

7. The information handling system of claim 1, where the at least one processing device is further configured to:
   identify multiple groups of multiple free PDs of the RAID storage memory that are not assigned to an existing VD, the multiple of groups of free PDs including the identified first group of free PDs and at least one additional second group of free PDs;
   sort individual PD's from the identified second group of free PDs by ascending storage size; and
   perform the following steps if the storage size available on the free PDs in the first identified group of free PDs is first found not to meet or exceed the storage size requirement specified for the current given VD:
      determine if the number of free PDs in the identified second group of free PDs equals or exceeds the minimum number of PDs required for a RAID level of the current given VD,
      determining if the storage size available on the free PDs in the second identified group of free PDs meets or exceeds a storage size requirement specified for the current given VD, and
      assigning the minimum number of free PDs required for the RAID level of the current given VD from a subgroup of the smallest free PDs selected from the at least one second group of multiple free PDs of the RAID storage memory if the number of PDs in the identified second group of free PDs equals or exceeds the minimum number of PDs required for a RAID level of the current given VD and if the storage size available on the PDs in the identified second group of free PDs meets or exceeds a storage size requirement specified for the current given VD.

8. The information handling system of claim 1, where the at least one processing device is further configured to individually perform the following steps for each given VD of the requested RAID configuration until the steps have been individually performed for all VDs of the requested RAID configuration if no identified group of free PDs having PDs sorted by ascending storage size is found to meet or exceed the storage size requirement specified for a current given VD and/or if no identified group of free PDs having PDs sorted by ascending storage size is found to include a number of free PDs that equals or exceeds the minimum number of PDs required for a RAID level of a current given VD:
   sorting individual PD's from an identified first group of free PDs by descending storage size;
   determining if the number of free PDs in the identified first group of free PDs having PDs sorted by descending storage size equals or exceeds the minimum number of PDs required for a RAID level of the current given VD,
   determining if the storage size available on the free PDs in the first identified group of free PDs having PDs sorted by descending storage size meets or exceeds a storage size requirement specified for the current given VD, and
   assigning the minimum number of free PDs required for the RAID level of the current given VD from a subgroup of the largest free PDs selected from the at least one first group of multiple free PDs of the RAID storage memory having PDs sorted by descending storage size if the number of PDs in the identified first group of free PDs equals or exceeds the minimum number of PDs required for a RAID level of the current given VD and if the storage size available on the PDs in the identified first group of free PDs having PDs sorted by descending storage size meets or exceeds a storage size requirement specified for the current given VD.

9. The information handling system of claim 1, where the at least one processing device is configured to create the requested RAID configuration of multiple virtual disks (VDs) on the RAID storage system without affecting the pre-existing configuration of PDs of the RAID storage memory that are assigned to one or more existing VDs that are already configured on the information handling system.

10. The information handling system of claim 1, where the at least one processing is configured to automatically create a user-requested RAID configuration of multiple virtual disks (VDs) on the RAID storage system without user-specification of PDs to use for creating the multiple VDs.

11. The information handling system of claim 1, where the multiple PDs of the RAID storage system include multiple PDs having different storage size from each other.

12. A method of creating a requested redundant array of independent disks (RAID) configuration of multiple virtual disks (VDs) on a RAID storage memory that includes an array of multiple individual physical drives (PDs) to which data is written, comprising using at least one processing device of an information handling system that is coupled to at least one processing device of the information handling system to create the requested RAID configuration of multiple virtual disks (VDs) on the RAID storage system by individually performing the following steps for each given VD of the requested RAID configuration until the steps have been individually performed for all VDs of the requested RAID configuration:
- identifying at least one first group of multiple free PDs of the RAID storage memory that are not assigned to an existing VD;
- sorting individual PD's from the identified first group of free PDs by ascending storage size;
- determining if the number of free PDs in the identified first group of free PDs equals or exceeds the minimum number of PDs required for a RAID level of the current given VD;
- determining if the storage size available on the free PDs in the first identified group of free PDs meets or exceeds a storage size requirement specified for the current given VD; and
- assigning the minimum number of free PDs required for the RAID level of the current given VD from a subgroup of the smallest free PDs selected from the at least one first group of multiple free PDs of the RAID storage memory if the number of PDs in the identified first group of free PDs equals or exceeds the minimum number of PDs required for a RAID level of the current given VD and if the storage size available on the PDs in the identified first group of free PDs meets or exceeds a storage size requirement specified for the current given VD.

13. The method of claim 12, further comprising using the at least one processing device of the information handling system to assign the minimum number of PDs required for the RAID level of the current given VD from a subgroup of the smallest free PDs selected from the at least one first group of multiple free PDs of the RAID storage memory by first creating a first subgroup of the smallest free PDs from the at least one first group of multiple free PDs of the RAID storage memory, the first subgroup containing a number of free PDs that is equal to the minimum number of PDs required for the RAID level of the current given VD; and either one of:
- then assigning the PDs of the first subgroup of the smallest free PDs to the current given VD if the storage size requirements for the current given VD can be met by the number of free PDs contained in the first subgroup of the smallest free PDs; or
- then creating at least one additional subgroup of the smallest free PDs from the at least one first group of multiple free PDs of the RAID storage memory if the storage size requirements for the current given VD cannot be met by the number of free PDs contained in the first subgroup of the smallest free PDs, the additional subgroup of the smallest free PDs containing a number of free PDs that is greater than the minimum number of PDs required for the RAID level of the current given VD, and then assigning the PDs of the additional subgroup of the smallest free PDs to the current given VD if the storage size requirements for the current given VD can be met by the number of free PDs contained in the additional subgroup of the smallest free PDs.

14. The method of claim 12, further comprising using the at least one processing device of the information handling system to create the requested RAID configuration of multiple virtual disks (VDs) by individually performing the following steps for each given VD of the requested RAID configuration until the steps have been individually performed for all VDs of the requested RAID configuration:
- identifying at least one second group of multiple free PDs of the RAID storage memory that are not assigned to an existing VD;
- sorting individual PD's from the identified second group of free PDs by ascending storage size;
- determining if the number of PDs in the identified second group of free PDs equals or exceeds the minimum number of PDs required for a RAID level of the current given VD;
- determining if the storage size available on the PDs in the second identified group of free PDs meets or exceeds a storage size requirement specified for the current given VD; and
- performing the following step if the number of PDs in the identified first group of free PDs does not equal or exceed the minimum number of PDs required for a RAID level of the current given VD and/or if the storage size available on the PDs in the identified first group of free PDs does not meet or exceed the storage size requirement specified for the current given VD:
  - assigning the minimum number of PDs required for the RAID level of the current given VD from a subgroup of the smallest free PDs selected from the at least one second group of multiple free PDs of the RAID storage memory if the number of PDs in the identified second group of free PDs equals or exceeds the minimum number of PDs required for a RAID level of the current given VD and if the storage size available on the PDs in the identified second group of free PDs meets or exceeds a storage size requirement specified for the current given VD.

15. The method of claim 12, further comprising using the at least one processing device of the information handling system to identify the at least one group of multiple free PDs of the RAID storage memory that are not assigned to an existing VD by identifying and grouping together free PDs having a common PD hardware type and file type.

16. The method of claim 12, further comprising using the at least one processing device of the information handling system to perform the following steps for each given VD of the requested RAID configuration:
- first identifying a pre-existing group of PDs of the RAID storage memory that are assigned to an existing VD that is already configured on the information handling system that matches the RAID level of the current given VD and that has sufficient free storage space left to create the current given VD on the pre-existing group of PDs; and
- then creating the current given VD on any such identified pre-existing group of PDs rather than assigning any free PDs to the current given VD.

17. The method of claim 12, further comprising using the at least one processing device of the information handling system to create the requested RAID configuration of multiple virtual disks (VDs) by first sorting the multiple VDs by descending storage size; and then individually performing the following steps for each given VD of the requested RAID configuration by starting with the largest given VD and repeating the following steps again for each successively smaller given VD until the steps have been individually performed for all VDs of the requested RAID configuration:
- identifying at least one first group of multiple free PDs of the RAID storage memory that are not assigned to an existing VD,
- sorting individual PD's from the identified first group of free PDs by ascending storage size,
- determining if the number of PDs in the identified first group of free PDs equals or exceeds the minimum number of PDs required for a RAID level of the current given VD,
- determining if the storage size available on the PDs in the first identified group of free PDs meets or exceeds a storage size requirement specified for the current given VD, and
- assigning the minimum number of PDs required for the RAID level of the current given VD from a subgroup of the smallest free PDs selected from the at least one first group of multiple free PDs of the RAID storage memory if the number of PDs in the identified first group of free PDs equals or exceeds the minimum number of PDs required for a RAID level of the current given VD and if the storage size available on the PDs in the identified first group of free PDs meets or exceeds a storage size requirement specified for the current given VD.

18. The method of claim 12, further comprising using the at least one processing device of the information handling system to:
- identify multiple groups of multiple free PDs of the RAID storage memory that are not assigned to an existing VD, the multiple of groups of free PDs including the identified first group of free PDs and at least one additional second group of free PDs;
- sort individual PD's from the identified second group of free PDs by ascending storage size; and
- perform the following steps if the storage size available on the free PDs in the first identified group of free PDs is first found not to meet or exceed the storage size requirement specified for the current given VD:
  - determine if the number of free PDs in the identified second group of free PDs equals or exceeds the minimum number of PDs required for a RAID level of the current given VD,
  - determining if the storage size available on the free PDs in the second identified group of free PDs meets or exceeds a storage size requirement specified for the current given VD, and
  - assigning the minimum number of free PDs required for the RAID level of the current given VD from a subgroup of the smallest free PDs selected from the at least one second group of multiple free PDs of the RAID storage memory if the number of PDs in the identified second group of free PDs equals or exceeds the minimum number of PDs required for a RAID level of the current given VD and if the storage size available on the PDs in the identified second group of free PDs meets or exceeds a storage size requirement specified for the current given VD.

19. The method of claim 12, further comprising using the at least one processing device of the information handling system to individually perform the following steps for each given VD of the requested RAID configuration until the steps have been individually performed for all VDs of the requested RAID configuration if no identified group of free PDs having PDs sorted by ascending storage size is found to meet or exceed the storage size requirement specified for a current given VD and/or if no identified group of free PDs having PDs sorted by ascending storage size is found to include a number of free PDs that equals or exceeds the minimum number of PDs required for a RAID level of a current given VD:
- sorting individual PD's from an identified first group of free PDs by descending storage size;
- determining if the number of free PDs in the identified first group of free PDs having PDs sorted by descending storage size equals or exceeds the minimum number of PDs required for a RAID level of the current given VD,
  - determining if the storage size available on the free PDs in the first identified group of free PDs having PDs sorted by descending storage size meets or exceeds a storage size requirement specified for the current given VD, and
  - assigning the minimum number of free PDs required for the RAID level of the current given VD from a subgroup of the largest free PDs selected from the at least one first group of multiple free PDs of the RAID storage memory having PDs sorted by descending storage size if the number of PDs in the identified first group of free PDs equals or exceeds the minimum number of PDs required for a RAID level of the current given VD and if the storage size available on the PDs in the identified first group of free PDs having PDs sorted by descending storage size meets or exceeds a storage size requirement specified for the current given VD.

20. The method of claim 12, further comprising using the at least one processing device of the information handling system to create the requested RAID configuration of multiple virtual disks (VDs) on the RAID storage system without affecting the pre-existing configuration of PDs of the RAID storage memory that are assigned to one or more existing VDs that are already configured on the information handling system.

21. The method of claim 12, further comprising using the at least one processing device of the information handling system to:
- receive a user request for a RAID configuration of multiple virtual disks (VDs) on the RAID storage system without a user specification of particular PDs to use for creating the multiple VDs; and
- respond to the user request by automatically creating the user-requested RAID configuration of multiple virtual disks (VDs) on the RAID storage system without user-specification of PDs to use for creating the multiple VDs.

22. The method of claim 12, where the multiple PDs of the RAID storage system include multiple PDs having different storage size from each other.

* * * * *